(12) United States Patent
Nakamura

(10) Patent No.: US 9,329,775 B2
(45) Date of Patent: May 3, 2016

(54) FIGURE DRAWING APPARATUS, FIGURE DRAWING METHOD AND RECORDING MEDIUM ON WHICH FIGURE DRAWING PROGRAMS ARE RECORDED

(71) Applicant: CASIO COMPUTER CO., LTD., Shibuya-ku, Tokyo (JP)

(72) Inventor: Kazuhisa Nakamura, Akiruno (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/281,578

(22) Filed: May 19, 2014

(65) Prior Publication Data

US 2014/0253484 A1 Sep. 11, 2014

Related U.S. Application Data

(63) Continuation of application No. PCT/JP2013/076175, filed on Sep. 19, 2013.

(30) Foreign Application Priority Data

Sep. 20, 2012 (JP) .................................. 2012-206653

(51) Int. Cl.
G06F 3/0488 (2013.01)
(52) U.S. Cl.
CPC .. G06F 3/04883 (2013.01); *G06F 2203/04104* (2013.01)
(58) Field of Classification Search
None
See application file for complete search history.

(56) References Cited

U.S. PATENT DOCUMENTS

| 7,289,120 B2 * | 10/2007 | Fukaya ........................ 345/440 |
| 2007/0188496 A1 | 8/2007 | Igusa |
| 2010/0149109 A1 * | 6/2010 | Elias ............................. 345/173 |
| 2011/0175821 A1 | 7/2011 | King |
| 2012/0050328 A1 | 3/2012 | Karoji |
| 2012/0210261 A1 | 8/2012 | Sarnoff et al. |

FOREIGN PATENT DOCUMENTS

| JP | 4224222 B2 | 2/2009 |
| JP | 2011-022964 A | 2/2011 |
| JP | 2012069085 A | 4/2012 |

OTHER PUBLICATIONS

International Search Report (ISR) and Written Opinion dated Jan. 2, 2014 issued in International Application No. PCT/JP2013/076175.
International Preliminary Report on Patentability (IPRP) including Written Opinion (in English) dated Apr. 2, 2015, issued in parent International Application No. PCT/JP2013/076175.
Japanese Office Action (and English translation thereof) dated Oct. 20, 2015, issued in counterpart Japanese Application No. 2012-206653.

* cited by examiner

*Primary Examiner* — Kenneth B Lee, Jr.
(74) *Attorney, Agent, or Firm* — Holtz, Holtz & Volek PC

(57) ABSTRACT

When a user touches positions on a touch panel display unit which correspond to a plurality of characteristic points of a user's desired figure, the user moves the touched positions in accordance with a shape of the figure and leaves his or her touches from the touched positions and touches an additional touch position, characteristic conditions of different figures (a circle, parallel lines, an equilateral triangle, a triangle, a square, a rectangle, a quadrangle, a straight line, a concentric circle, an ellipse, etc.) are determined in accordance with the touched positions, a locus of the movement of the touched positions and the additional touch position and a type of the figure and a drawing-position thereof are determined.

13 Claims, 16 Drawing Sheets

FIG.5

| MULTI-TOUCH FIGURE INPUT | ―G(17) |

DRAW A FIGURE (SEE THE FOLLOWING EXAMPLES).
CIRCLE: PLACE FINGERS ON TWO POINTS LIKE A COMPASS AND DRAW AN ARC WITH ONE OF THE FINGERS.
PARALLEL LINES: PLACE FINGERS ON TWO POINTS AND MOVE THE FINGERS IN PARALLEL.
EQUILATERAL TRIANGLE: TOUCH ONE POINT AND THEN TOUCH OTHER TWO POINTS WITHOUT RELEASING A FINGER FROM THE ONE POINT.
SQUARE: TOUCH TWO POINTS AND THEN RELEASE FINGERS FROM THE TWO POINTS AND TOUCH OTHER TWO POINTS AT ONCE.
CONCENTRIC CIRCLE: TOUCH THREE POINTS WITH THREE FINGERS AND DRAW AN ARC WITH REFERENCE TO TWO OF THE POINTS WITH THE OTHER POINT TOUCHED.

FIGURE DRAWING APPARATUS, FIGURE DRAWING METHOD AND RECORDING MEDIUM ON WHICH FIGURE DRAWING PROGRAMS ARE RECORDED

CROSS-REFERENCE TO RELATED APPLICATIONS

This application is a Continuation Application of PCT Application No. PCT/JP2013/076175, filed Sep. 19, 2013 and based upon and claiming the benefit of priority from Japanese Patent Application No. 2012-206653, filed Sep. 20, 2012, the entire contents of all of which are incorporated herein by reference.

BACKGROUND OF THE INVENTION

1. Field of the Invention

The present invention relates to a figure drawing apparatus, a figure drawing method and a recording medium on which figure drawing programs are recorded.

2. Description of the Related Art

Conventionally, as an apparatus for inputting an arbitrary figure according to a user's operation, there has been considered a system including a touch panel display unit to input and display a figure corresponding to a touch operation of directly touching the touch panel display unit with a user's finger (Jpn. Pat. Appln. KOKAI Publication No. 2011-22964, for example).

In the above conventional input display system, when a user moves his or her finger on the touch panel display unit with one point of the display unit touched with the finger, a handwritten figure corresponding to a locus of the movement is drawn and displayed. When the handwritten figure is displayed, the user sets a deformation mode and moves the figure while touching a plurality of points of the figure. Accordingly, the user is able to deform the figure to have a desired shape and display it.

The above conventional input display system is capable of drawing and displaying a handwritten figure by touch operation. However, in order to display a regular figure such as a perfect circle, an equilateral triangle and a square, a user has to set the deformation mode, and touch and move a plurality of points of the handwritten figure, thereby deforming the handwritten figure.

For the above reason, in order to display a user's desired regular figure, a user has to perform a two-stage operation of an operation of inputting a handwritten figure and an operation of deforming the input handwritten figure, which still causes a lot of trouble with the user. Moreover, conventionally, a user had to input figures and characters separately, which was a complicated operation.

BRIEF SUMMARY OF THE INVENTION

The present invention has been made to resolve the above problems. Accordingly, it is an object of the present invention to provide a figure drawing apparatus capable of easily inputting and displaying user's desired figures and characters by user's intuitive and graceful touch operations, and a control program for controlling the figure drawing apparatus.

A figure drawing apparatus according to the present invention, comprises a touch panel, a display unit, a touch position detection unit which detects (i) one touch position, (ii) a plurality of touch positions simultaneously, and (iii) a movement of at least one of the touch positions detected in accordance with a user's touch operation of the touch panel, a drawing figure determination unit which, when the touch position detection unit detects a plurality of touch positions simultaneously, determines a type of a figure and a drawing-position detected simultaneously and a following movement of the touch positions detected by the touch position detection unit, a figure display control unit which displays a figure on the display unit in accordance with the type of the figure and the drawing-position of the figure determined by the drawing figure determination unit, a one-point locus display control unit which, when the touch position detection unit detects one touch position of one point and then the movement of the one touch position, displays a locus of the movement of the one touch position on the display unit, and a character display control unit which displays the locus of the movement of the one touch position displayed by the one-point locus display control unit on the display unit as a character.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 shows an operation instruction screen G for a user which is displayed on a touch panel color display unit 17 as a result of a figure drawing process being started by the touch panel PDA 10;

DETAILED DESCRIPTION OF THE INVENTION

An embodiment of the present invention will be described below with reference to the accompanying drawings.

Figure 1:
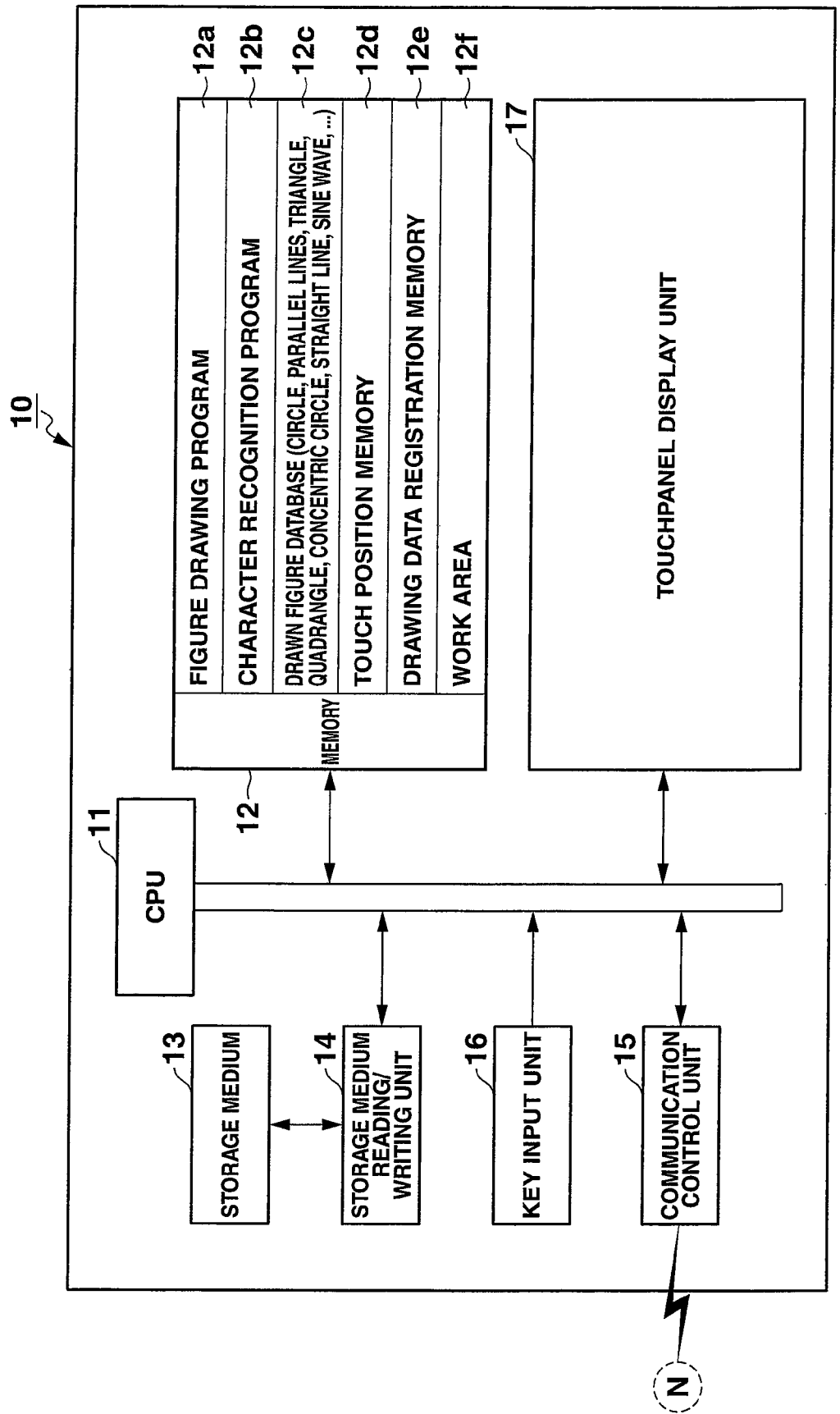
FIG. 1 is a block diagram showing a configuration of an electronic circuit of a touch panel PDA 10 according to an embodiment of a figure drawing apparatus of the present invention.

FIG. 1 is a block diagram showing a configuration of an electronic circuit of a touch panel PDA 10 according to an embodiment of a figure drawing apparatus of the present invention.

The figure drawing apparatus is configured as a touch panel personal digital assistant (PDA) 10 having a figure drawing function, which will be described below, a personal computer (PC), a cellular phone, a handheld game console or the like.

The PDA 10 is configured by a computer which reads programs stored in different storage mediums or transferred programs to control the operation of the PDA 10. The electronic circuit includes a central processing unit (CPU) 11.

The CPU 11 controls the operation of each unit of the circuit in accordance with an apparatus control program that is previously stored in a memory 12, an apparatus control program that is stored in the memory 12 from an external storage medium 13 such as a ROM card through a storage medium reading/writing unit 14, or an apparatus control program that is stored in the memory 12 from a Web server (a program server in this case) on the Internet N through a communication control unit 15.

The apparatus control programs stored in the memory 12 are activated in response to a key input signal corresponding to a user's single touch operation or simultaneous multi touch operation from a key input unit 16, touch input signals corresponding to a user's operation from a touch panel color display unit 17, a communication signal for communicating with Web servers on the Internet N which are connected through the communication control unit 15, or a connection communication signal for communicating with a memory card (storage medium) 13 such as an EEPROM, a RAM and a ROM, which is externally connected through the storage medium reading/writing unit 14.

As described above, for example, the memory 12, storage medium reading/writing unit 14, communication control unit 15, key input unit 16 and touch panel color display unit 17 are connected to the CPU 11.

As the apparatus control programs stored in the memory 12, there are a system program for controlling the entire operation of the PDA 10 and a communication program for performing data communications with, for example, Web servers on the Internet and user personal computers (PC) (not shown) through the communication control unit 15. In addition, different application programs, such as a mail function, a sound recording/playback function, a picture recording/playback function, a document processing function and a schedule management function, are stored previously in the memory 12 or downloaded from outside.

Furthermore, a figure drawing program 12a for fulfilling a figure drawing function according to the present embodiment and a character recognition program 12b for recognizing a handwritten character as a result of execution of the figure drawing program 12a are stored in the memory 12.

Moreover, the memory 12 includes a drawing figure database 12c for storing different basic figures (a straight line, parallel lines, a triangle, an equilateral triangle, a quadrangle, a rectangle, a square, a circle, a concentric circle, an ellipse, a quadratic curve, a sinusoidal curve, hyperbolic sine waves, etc.) which can be drawn in accordance with the figure drawing program 12a. The memory 12 also includes a touch position memory 12d, a drawing data registration memory 12e and a work area 12f.

Data of the coordinates and locus of a touch position, which are detected according to a user's touch of the touch panel of the touch panel color display unit 17, is updated in real time and then stored in the touch position memory 12d.

Data of the entire figure drawing screen, which is drawn and displayed on the touch panel color display unit 17 in accordance with the figure drawing program 12a, is stored in the drawing data registration memory 12e.

The touch panel PDA 10 so configured achieves a figure drawing function, as will be described below, when the CPU 11 controls the operation of each unit of the circuit in accordance with the instructions described in the figure drawing program 12a and the character recognition program 12b to execute software and hardware in cooperation with each other.

Next, a specific operation associated with the figure drawing function of the touch panel PDA 10 with the above configuration will be described below.

Figure 2:
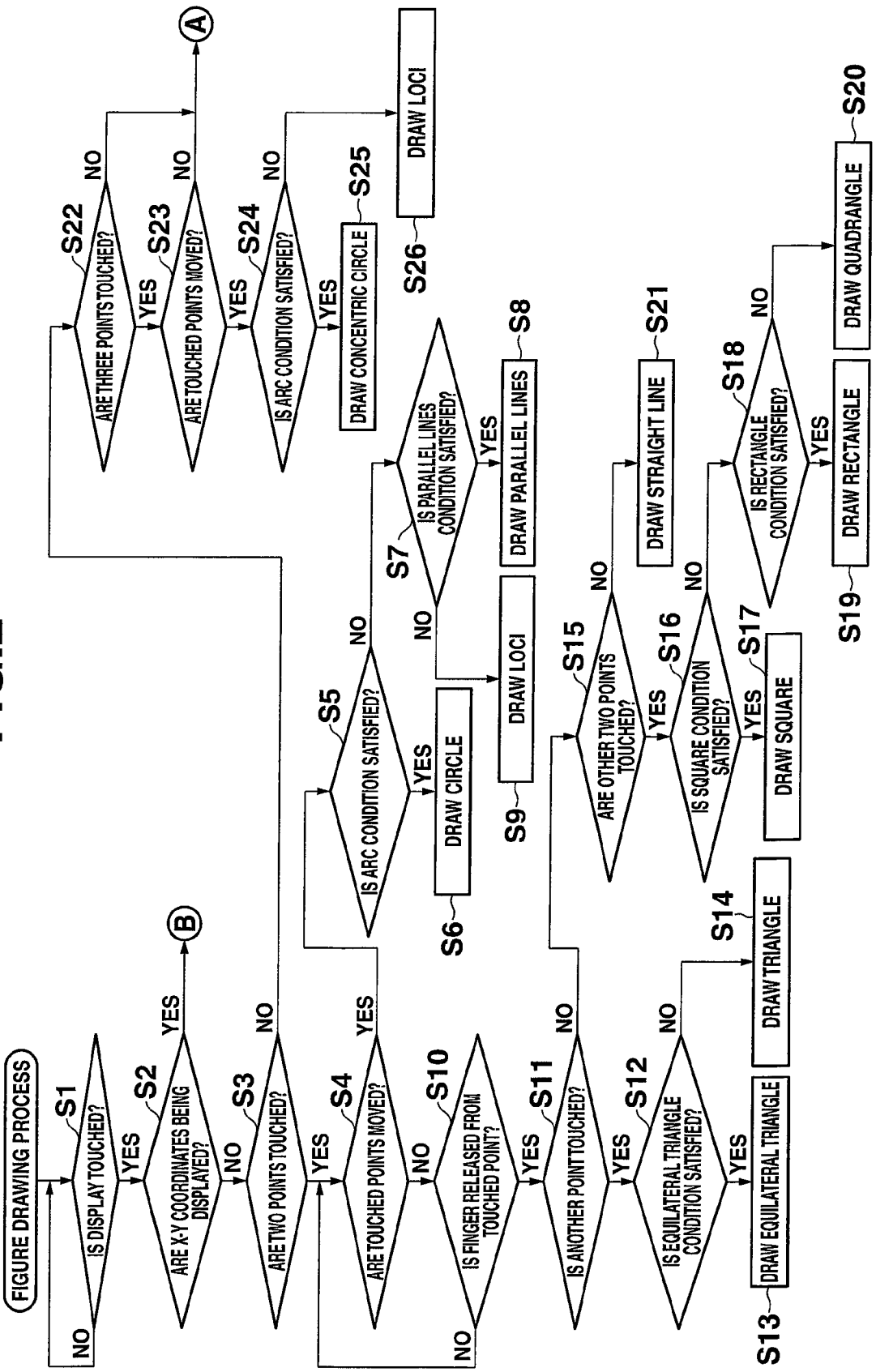
FIG. 2 is a flowchart showing a figure drawing process (part 1) to be performed by the touch panel PDA 10.

FIG. 2 is a flowchart showing a figure drawing process (part 1) to be performed by the touch panel PDA 10.

Figure 3:
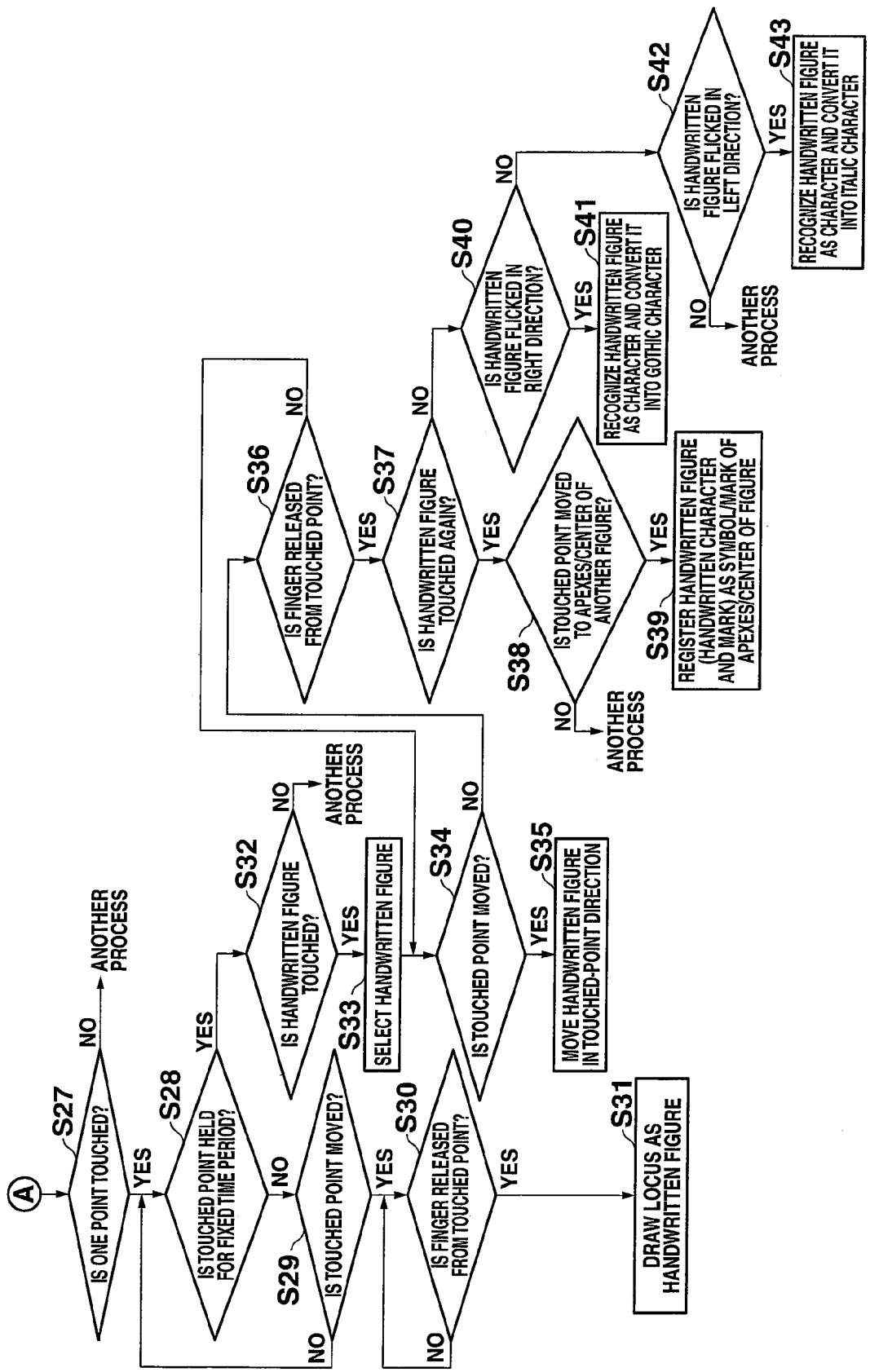
FIG. 3 is a flowchart showing a figure drawing process (part 2) to be performed by the touch panel PDA 10.

FIG. 3 is a flowchart showing a figure drawing process (part 2) to be performed by the touch panel PDA 10.

Figure 4:
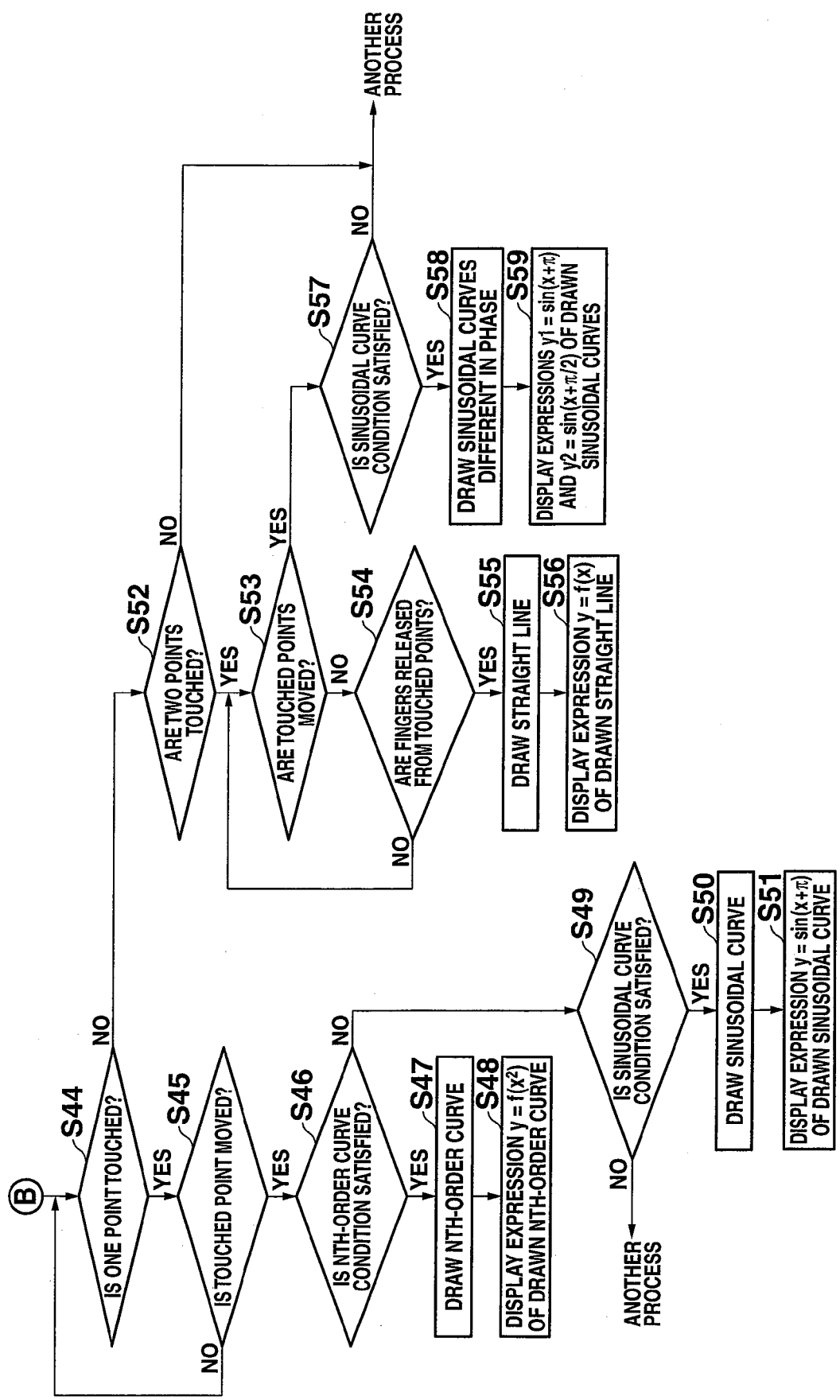
FIG. 4 is a flowchart showing a figure drawing process (part 3) to be performed by the touch panel PDA 10.

FIG. 4 is a flowchart showing a figure drawing process (part 3) to be performed by the touch panel PDA 10.

FIG. 5 shows an operation instruction screen G for a user which is displayed on the touch panel color display unit 17 as a result of a figure drawing process being started by the touch panel PDA 10.

When the figure drawing program 12a is activated by selecting an application program according to a user's operation, the operation instruction screen G is displayed on the touch panel color display unit 17 (referred to as a "touch panel display unit 17" hereinafter) in order to instruct a user how to perform touch operations corresponding to different types of drawing, as shown in FIG. 5.

(Drawing of Circle Cir)

Figure 6A:
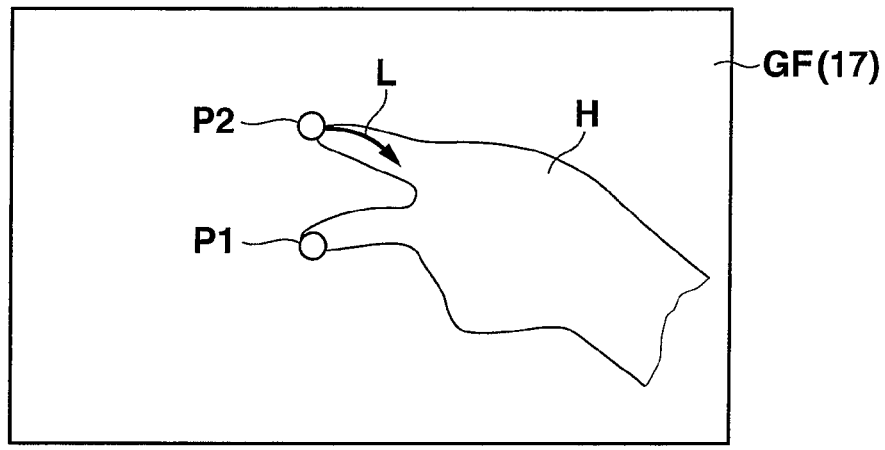
FIG. 6A shows a display operation performed on a figure input screen GF in accordance with a touch operation to draw and display circle Cir through the figure drawing process of the touch panel PDA 10.
Figure 6B:
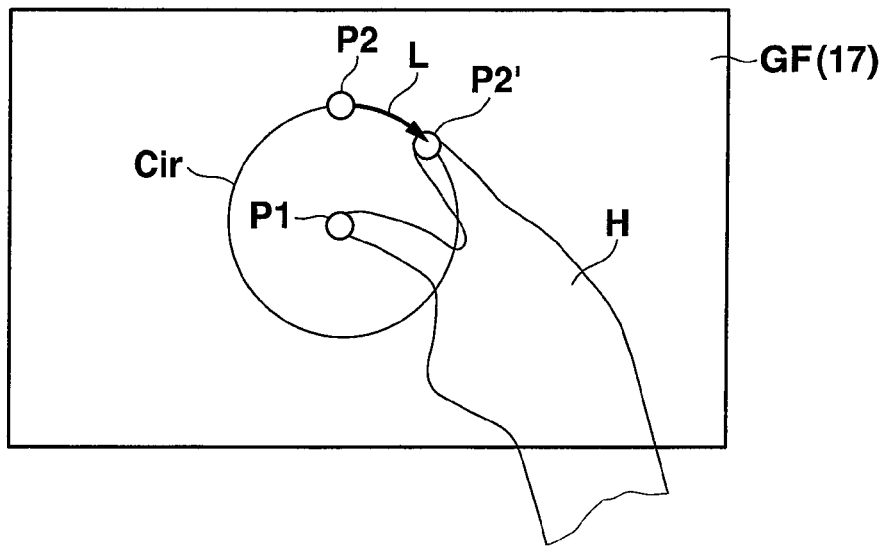
FIG. 6B shows another display operation performed on the figure input screen GF in accordance with a touch operation to draw and display circle Cir through the figure drawing process of the touch panel PDA 10.

FIGS. 6A and 6B each show a display operation performed on a figure input screen GF in accordance with a touch operation to draw and display circle Cir through the figure drawing process of the touch panel PDA 10.

If it is judged that the touch panel display unit 17 is touched according to a user's operation (Yes in step S1), it is determined whether X-Y coordinates are being displayed for graphical representation (step S2).

If it is judged that no X-Y coordinates are being displayed (No in step S2), it is judged whether two points are touched simultaneously (step S3) or three points are touched (step S22) or one point is touched (step S27) in accordance with the touch operation.

If it is judged that user H touches two points P1 and P2 simultaneously on the touch panel display unit 17, as shown in FIG. 6A (Yes in step S3), it is judged whether touched points P1 and P2 are moved or not (step S4).

If touched point P2 is moved like an arc around touched point P1, it is judged that touched point P2 is moved (Yes in step S4) and then it is judged whether locus L of touched point P2 satisfies a fixed condition of the arc with respect to touched point P1 (step S5).

If it is judged that the arc condition of locus L from touched point P2 to touched point P2' corresponds to radius P1-P2 (P2') is satisfied, as shown in FIG. 6B (Yes in step S5), basic figure data of the circle is read out of the drawing figure database 12c, and circle Cir whose size is adjusted is drawn and displayed such that touched point P1 is located on the center of the circle and touched point P2 (P2') is located on the arc (step S6).

(Drawing of Parallel Lines PL)

Figure 7A:
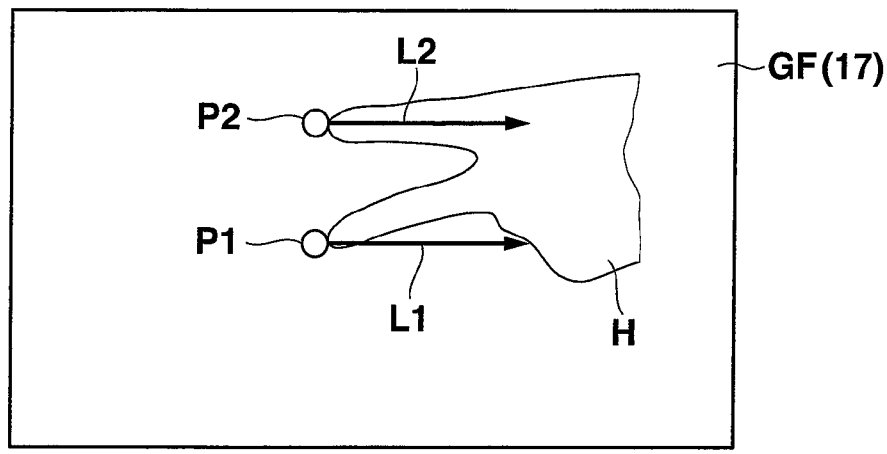
FIG. 7A shows a display operation performed on the figure input screen GF in accordance with a touch operation to draw and display parallel lines PL through a figure drawing process of the touch panel PDA 10.
Figure 7B:
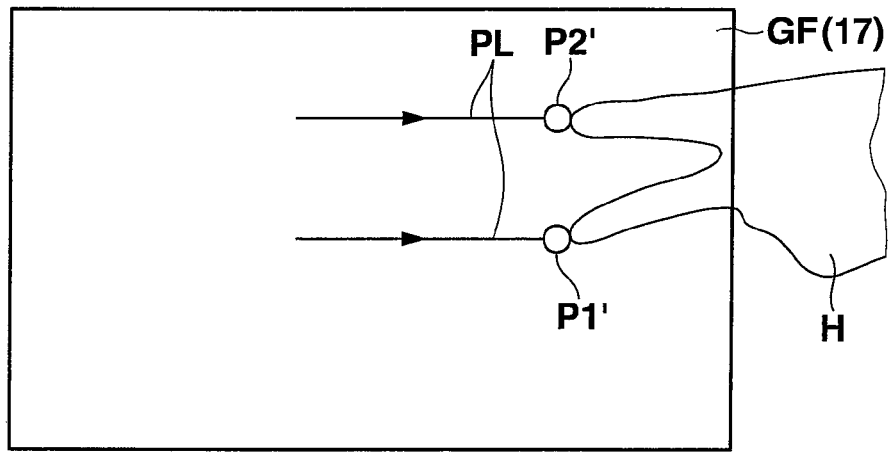
FIG. 7B shows another display operation performed on the figure input screen GF in accordance with a touch operation to draw and display parallel lines PL through the figure drawing process of the touch panel PDA 10.

FIGS. 7A and 7B each show a display operation performed on the figure input screen GF in accordance with a touch operation to draw and display parallel lines PL through a figure drawing process of the touch panel PDA 10.

After it is judged that user H touches two points P1 and P2 simultaneously on the touch panel display unit 17 as shown in FIG. 7A (Yes in step S3), if both touched points P1 and P2 are moved in parallel (Yes in step S4), it is judged that touched points P1 and P2 are moved (Yes in step S4).

If it is judged that locus L1 of touched point P1 and locus L2 of touched point P2 satisfy a fixed condition of the parallel lines (Yes in step S7), basic figure data of the parallel lines is read out of the drawing figure database 12c, and parallel lines PL whose size is adjusted are drawn and displayed such that a first line between touched point P1 and moved point P1' and a second line between touched point P2 and moved point P2' become parallel with each other as shown in FIG. 7B (step S8).

If it is judged that loci L1 and L2 of touched points P1 and P2 do not satisfy the fixed condition of the parallel lines (No in step S7), the loci of the movements corresponding to the first line between P1 and P1' and the second line between P2 and P2' are drawn and displayed as they are (step S9).

(Drawing of Equilateral Triangle TR)

Figure 8A:
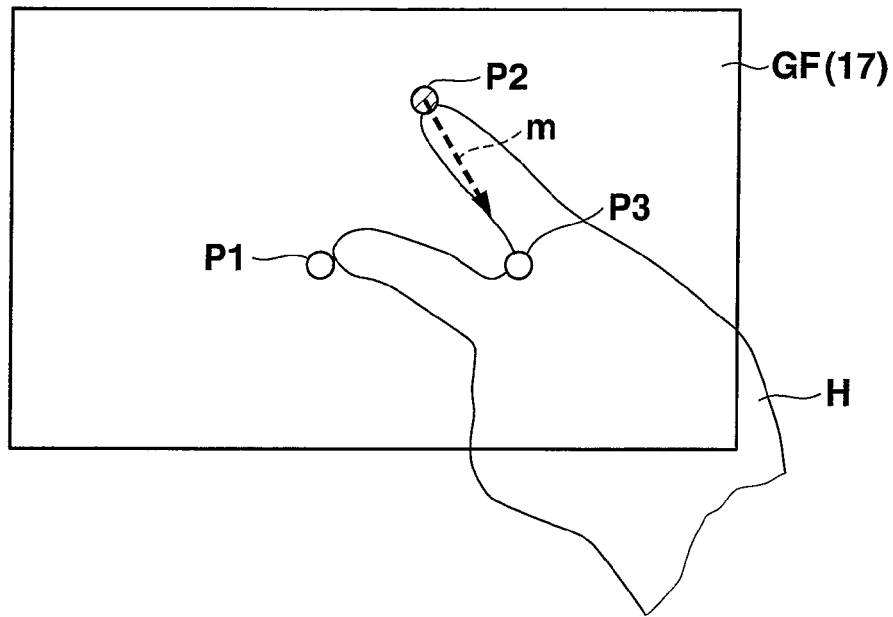
FIG. 8A shows a display operation performed on the figure input screen GF in accordance with a touch operation to draw and display equilateral triangle TR through a figure drawing process of the touch panel PDA 10.
Figure 8B:
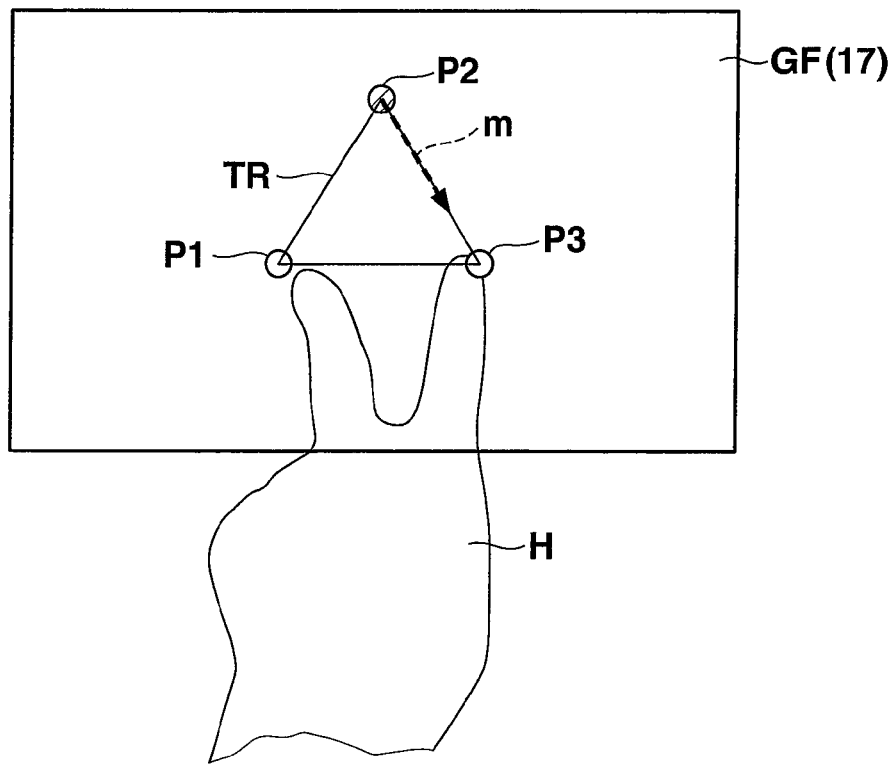
FIG. 8B shows another display operation performed on the figure input screen GF in accordance with a touch operation to draw and display equilateral triangle TR through the figure drawing process of the touch panel PDA 10.

FIGS. 8A and 8B each show a display operation performed on the figure input screen GF in accordance with a touch operation to draw and display equilateral triangle TR through a figure drawing process of the touch panel PDA 10.

After it is judged that user H touches two points P1 and P2 simultaneously on the touch panel display unit 17 as shown in FIG. 8A (Yes in step S3), the user releases his or her finger from one (P2) of the touched points and moves the finger as indicated by arrow m and touches another point P3 as shown in FIG. 8B. Thus, it is determined that the touched point P2 is released (Yes in step S10) and also it is judged that the point P3 is touched (Yes in step S11).

If it is judged that the positional relation among touched points P1, P2 and P3 satisfies a fixed condition of the equilateral triangle (Yes in step S12), basic figure data of the equilateral triangle is read out of the drawing figure database 12c, and an equilateral triangle TR whose size is adjusted is drawn and displayed such that its three apexes coincide with touched points P1, P2 and P3 within a fixed range (step S13).

If it is judged that the positional relation among touched points P1, P2 and P3 does not satisfy the fixed condition of the equilateral triangle (No in step S12), a triangle having touched points P1, P2 and P3 as the apexes thereof is drawn and displayed as it is (step S14).

(Drawing of Square RS)

Figure 9A:
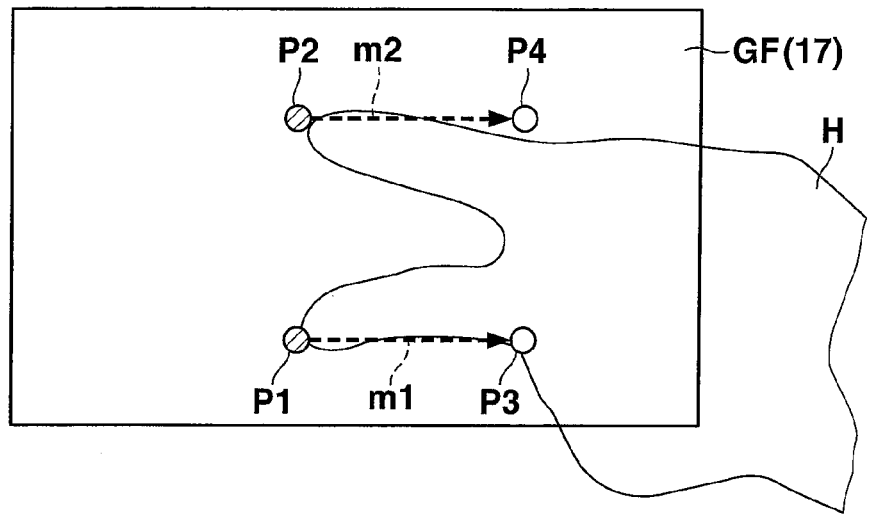
FIG. 9A shows a display operation performed on the figure input screen GF in accordance with a touch operation to draw and display square RS through a figure drawing process of the touch panel PDA 10.
Figure 9B:
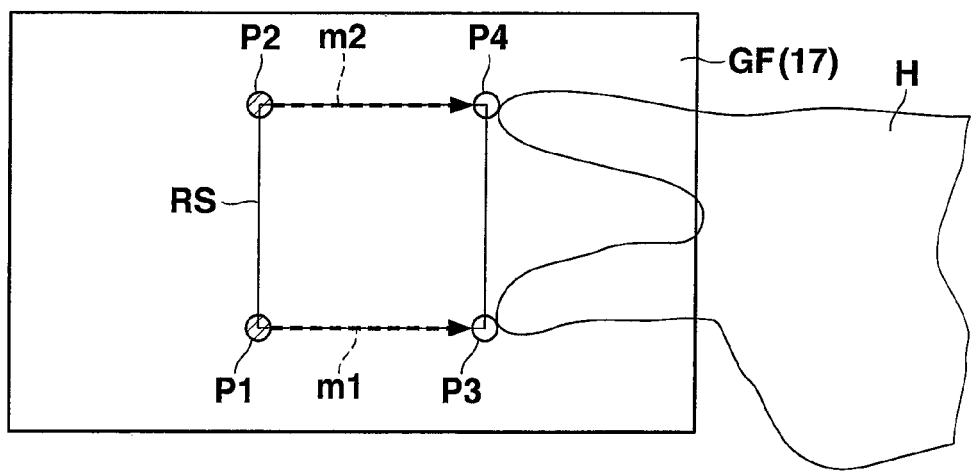
FIG. 9B shows another display operation performed on the figure input screen GF in accordance with a touch operation to draw and display square RS through the figure drawing process of the touch panel PDA 10.

FIGS. 9A and 9B each show a display operation performed on the figure input screen GF in accordance with a touch operation to draw and display square RS through a figure drawing process of the touch panel PDA 10.

After it is judged that user H touches two points P1 and P2 simultaneously on the touch panel display unit 17 as shown in FIG. 9A (Yes in step S3), the user releases his or her fingers from the touched points P1 and P2 and moves the fingers as indicated by arrows m1 and m2 and touches other two points P3 and P4 as shown in FIG. 9B. Thus, it is determined that the touched points P1 and P2 are released (Yes in step S10) and also it is judged that the points P3 and P4 are touched (Yes in step S15).

If it is judged that the positional relation among touched points P1, P2, P3 and P4 satisfies a fixed condition of the square (Yes in step S16), basic figure data of the square is read out of the drawing figure database 12c, and a square RS whose size is adjusted is drawn and displayed such that its four apexes coincide with their respective four touched points P1, P2, P3 and P4 within a fixed range (step S17).

If it is judged that the positional relation among touched points P1, P2, P3 and P4 does not satisfy the fixed condition of the square (No in step S16), then it is judged that the positional relation satisfies a fixed condition of a rectangle (Yes in step S18). And basic figure data of the rectangle is read out of the drawing figure database 12c, and a rectangle whose size is adjusted is drawn and displayed such that its four apexes coincide with their respective touched points P1, P2, P3 and P4 within a fixed range (step S19).

If it is judged that the positional relation among touched points P1, P2, P3 and P4 does not satisfy the fixed condition of the rectangle, either (No in step S18), a quadrangle having touched points P1, P2, P3 and P4 as the apexes thereof is drawn and displayed as it is (step S20).

(Drawing of Straight Line SL)

Figure 10A:
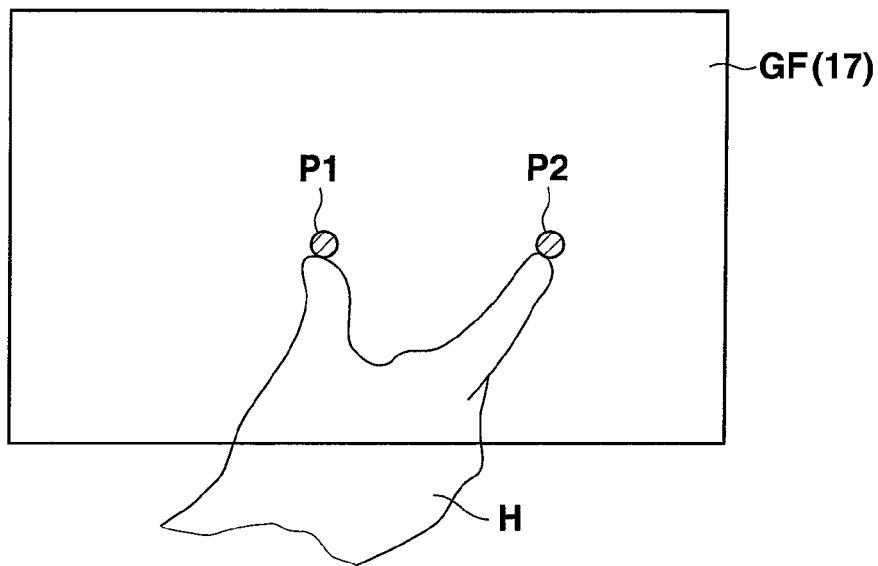
FIG. 10A shows a display operation performed on the figure input screen GF in accordance with a touch operation to draw and display straight line SL through a figure drawing process of the touch panel PDA 10.
Figure 10B:
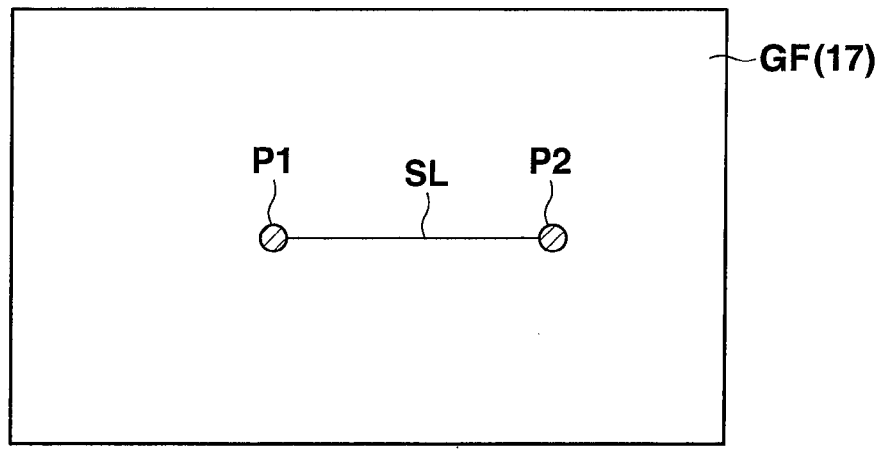
FIG. 10B shows another display operation performed on the figure input screen GF in accordance with a touch operation to draw and display straight line SL through the figure drawing process of the touch panel PDA 10.

FIGS. 10A and 10B each show a display operation performed on the figure input screen GF in accordance with a touch operation to draw and display straight line SL through a figure drawing process of the touch panel PDA 10.

After it is judged that user H touches two points P1 and P2 simultaneously on the touch panel display unit 17 as shown in FIG. 10A (Yes in step S3), the user keeps releasing his or her fingers from the touched points P1 and P2 as shown in FIG. 10B. Then, it is judged that the touched points P1 and P2 are released (Yes in step S10) and also it is judged that another one or two points are not touched (No in step S11→No in step S15).

Accordingly, a straight line SL having touched points P1 and P2 as the end points thereof is drawn and displayed (step S21).

(Drawing of Concentric Circle CC)

Figure 11A:
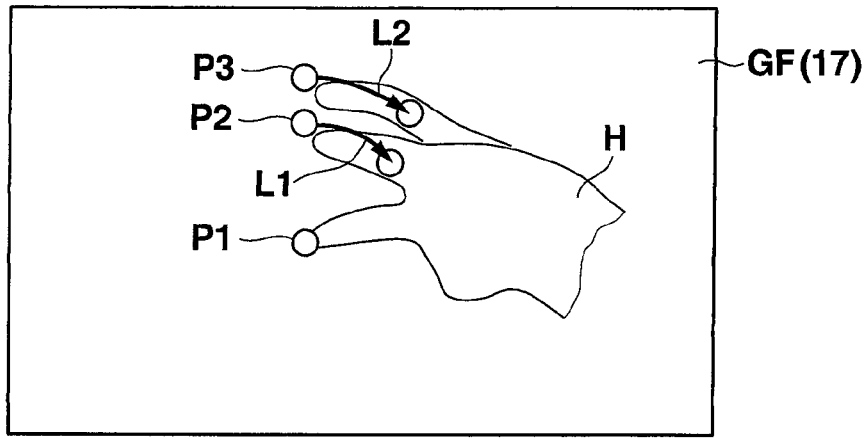
FIG. 11A shows a display operation performed on the figure input screen GF in accordance with a touch operation to draw and display concentric circle CC through a figure drawing process of the touch panel PDA 10.
Figure 11B:
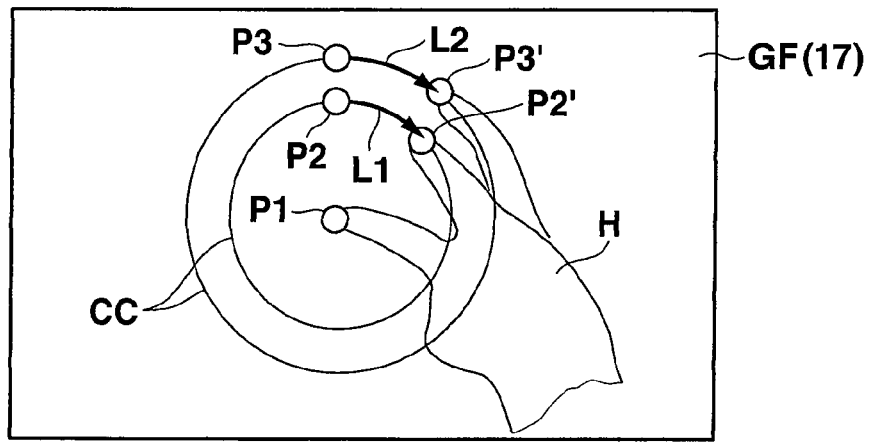
FIG. 11B shows another display operation performed on the figure input screen GF in accordance with a touch operation to draw and display concentric circle CC through the figure drawing process of the touch panel PDA 10.

FIGS. 11A and 11B each show a display operation performed on the figure input screen GF in accordance with a touch operation to draw and display concentric circle CC through a figure drawing process of the touch panel PDA 10.

If it is determined that user H touches three points P1, P2 and P3 on the touch panel display unit 17 as shown in FIG. 11A (Yes in step S22), it is determined that touched points P1, P2 and P3 are moved (Yes in step S23).

If touched points P2 and P3 are moved like an arc around touched point P1, it is judged that touched points P2 and P3 are moved (Yes in step S23) and then it is judged whether loci L1 and L2 of touched points P2 and P3 satisfy a fixed condition of the arc with respect to touched point P1 (step S24).

If it is judged that the arc condition of locus L1 from touched point P2 to touched point P2' and locus L2 from touched point P3 to touched point P3' correspond to radius P1-P2 (P2') and radius P1-P3 (P3') is satisfied, as shown in FIG. 11B (Yes in step S24), basic figure data of the concentric circle is read out of the drawing figure database 12c, and a concentric circle CC whose size is adjusted is drawn and displayed such that touched point P1 is located on the center of the concentric circle and touched points P2 (P2') and P3 (P3') are located on the arc (step S25).

If it is judged that the locus L1 from touched point P2 to touched point P2' and the locus L2 from touched point P3 to touched point P3' do not satisfy the fixed condition of the arc (No in step S24), a first locus from touched point P2 to touched point P2' and a second locus from touched point P3 to touched point P3' are drawn and displayed as they are (step S26).

(Drawing of Combination of a Plurality of Figures)

Figure 12A:
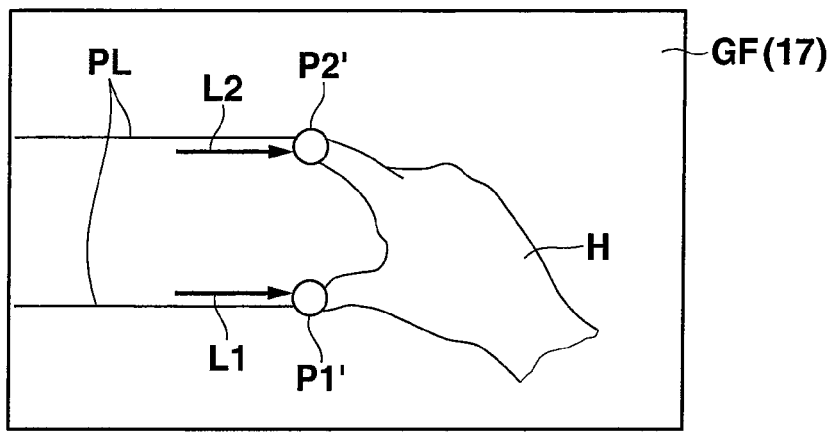
FIG. 12A shows a display operation (part 1) performed on the figure input screen GF in accordance with a touch operation to draw and display a combination of parallel lines PL, triangle TR and circle Cir through a figure drawing process of the touch panel PDA 10.
Figure 12B:
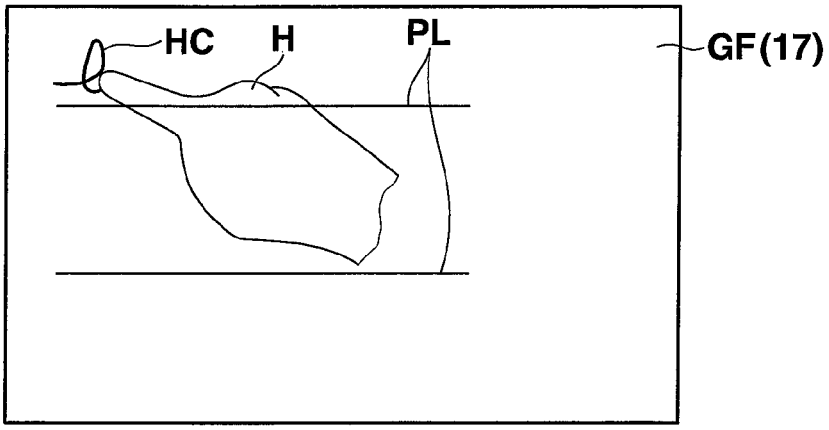
FIG. 12B shows another display operation (part 1) performed on the figure input screen GF in accordance with a touch operation to draw and display the combination of parallel lines PL, triangle TR and circle Cir through the figure drawing process of the touch panel PDA 10.
Figure 12C:
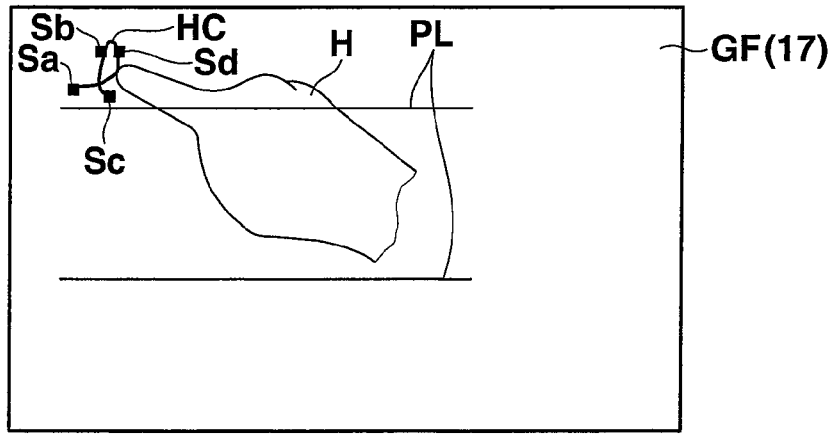
FIG. 12C shows another display operation (part 1) performed on the figure input screen GF in accordance with a touch operation to draw and display the combination of parallel lines PL, triangle TR and circle Cir through the figure drawing process of the touch panel PDA 10.

FIGS. 12A, 12B and 12C each show a display operation (part 1) performed on the figure input screen GF in accordance with a touch operation to draw and display a combination of parallel lines PL, triangle TR and circle Cir through a figure drawing process of the touch panel PDA 10.

Figure 13A:
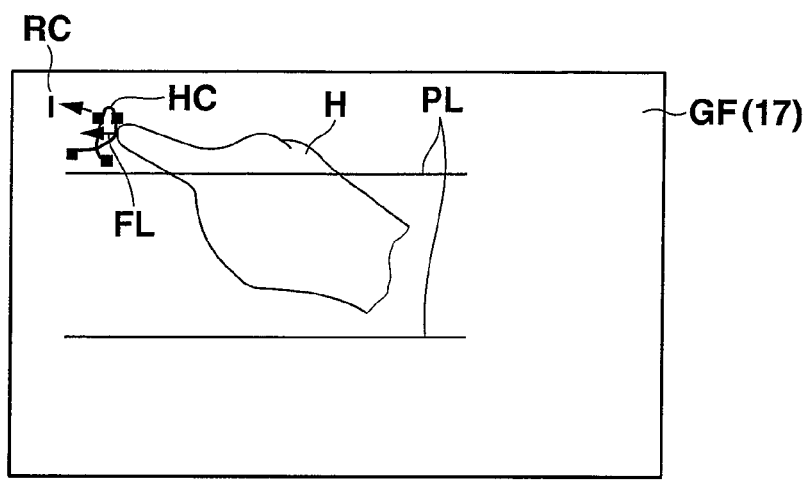
FIG. 13A shows a display operation (part 2) performed on the figure input screen GF in accordance with a touch operation to draw and display a combination of parallel lines PL, triangle TR and circle Cir through a figure drawing process of the touch panel PDA 10.
Figure 13B:
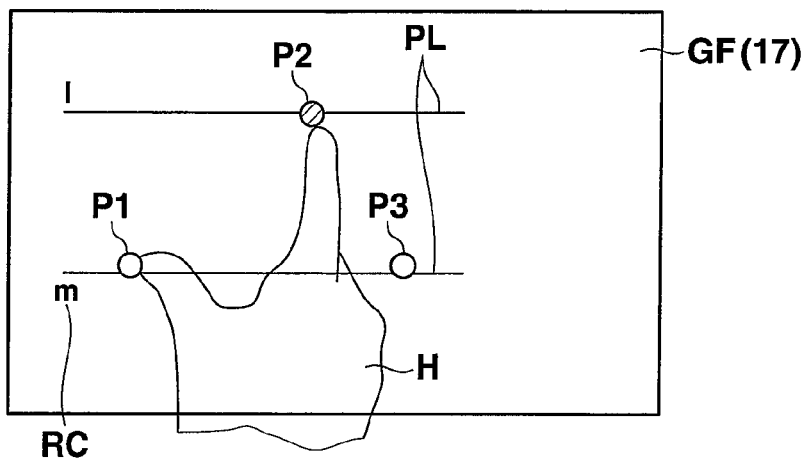
FIG. 13B shows another display operation (part 2) performed on the figure input screen GF in accordance with a touch operation to draw and display the combination of parallel lines PL, triangle TR and circle Cir through the figure drawing process of the touch panel PDA 10.
Figure 13C:
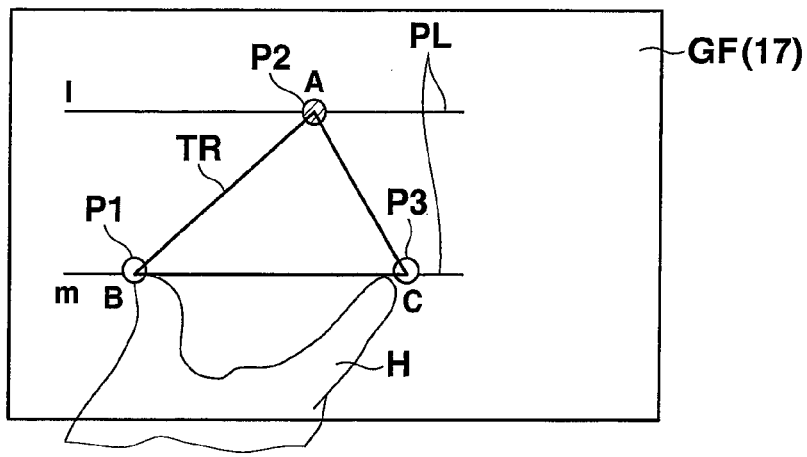
FIG. 13C shows another display operation (part 2) performed on the figure input screen GF in accordance with a touch operation to draw and display the combination of parallel lines PL, triangle TR and circle Cir through the figure drawing process of the touch panel PDA 10.

FIGS. 13A, 13B and 13C each show a display operation (part 2) performed on the figure input screen GF in accordance with a touch operation to draw and display a combination of parallel lines PL, triangle TR and circle Cir through a figure drawing process of the touch panel PDA 10.

Figure 14A:
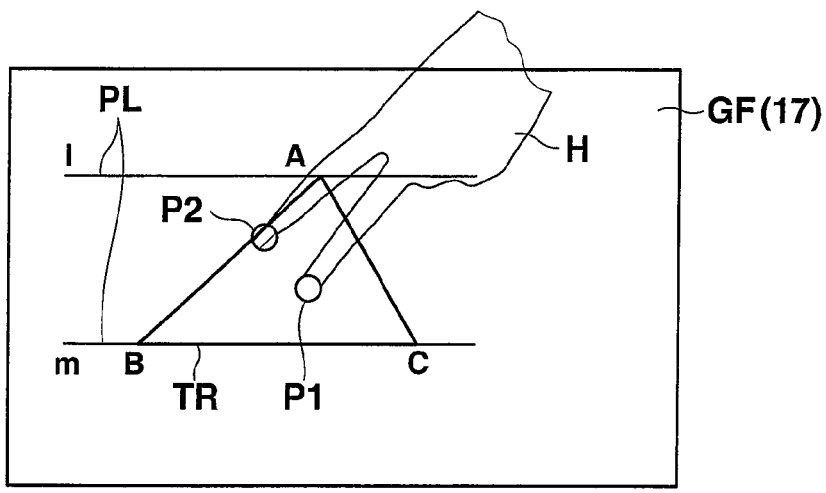
FIG. 14A shows a display operation (part 3) performed on the figure input screen GF in accordance with a touch operation to draw and display a combination of parallel lines PL, triangle TR and circle Cir through a figure drawing process of the touch panel PDA 10.
Figure 14B:
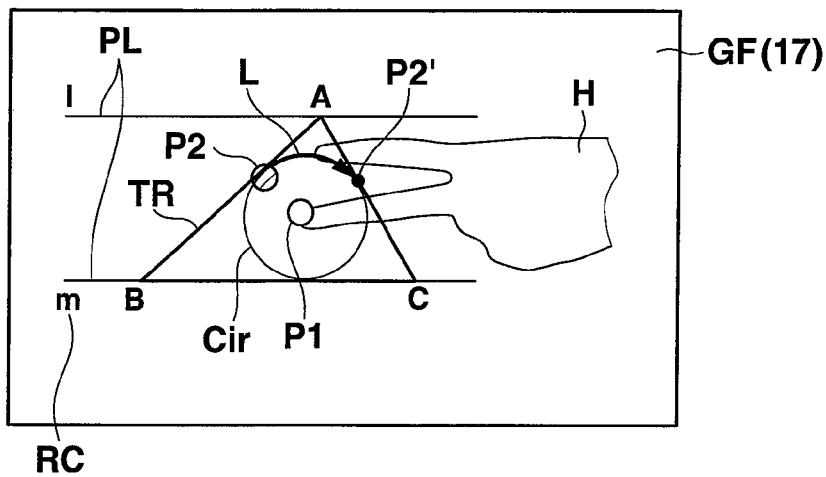
FIG. 14B shows another display operation (part 3) performed on the figure input screen GF in accordance with a touch operation to draw and display the combination of parallel lines PL, triangle TR and circle Cir through the figure drawing process of the touch panel PDA 10.
Figure 14C:
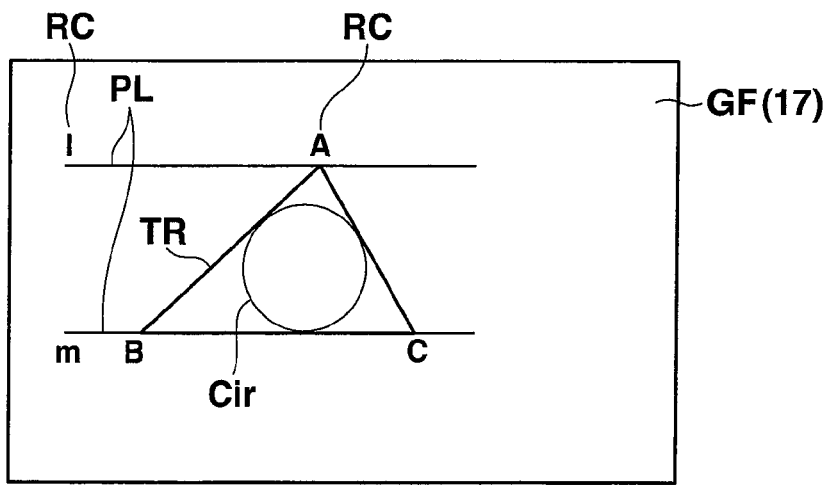
FIG. 14C shows another display operation (part 3) performed on the figure input screen GF in accordance with a touch operation to draw and display the combination of parallel lines PL, triangle TR and circle Cir through the figure drawing process of the touch panel PDA 10.

FIGS. 14A, 14B and 14C each show a display operation (part 3) performed on the figure input screen GF in accordance with a touch operation to draw and display a combination of parallel lines PL, triangle TR and circle Cir through a figure drawing process of the touch panel PDA 10.

While the parallel lines PL corresponding to touched points P1' and P2' and their loci L1 and L2 are being drawn and displayed on the touch panel display unit 17 in accordance with the processes of steps S1 to S5, S7 and S8 described above as shown in FIGS. 12A and 12B, if user H first moves one of the touched points and inputs a handwritten character "l" in order to add characters "l" and "m" to the parallel lines PL, it is judged that one point is touched and moved (Yes in step S27 Yes in step S29). After that, it is judged that the user releases the touched point (Yes in step S30), and a locus corresponding to the movement of the touched point is drawn and displayed as a handwritten character "l" HC (step S31).

If the handwritten character "l" HC displayed above the parallel lines PL is touched and held at one point by the user as shown in FIG. 12C, it is judged that one point is touched and held for a fixed time period (Yes in step S27→Yes in step S28) and it is also judged that the handwritten character "l" HC is touched (step S32). Accordingly, the handwritten character "l" HC is selected and selection marks Sa to Sd are displayed (step S33).

When the handwritten character "l" HC is touched and selected, if it is judged that the touched point is moved (Yes in step S34), the handwritten character "l" HC is displayed while moving in the direction of the movement of the touched point (step S35).

After it is judged that the user's touch is released from the selected handwritten character HC (Yes in step S36), if it is determined that the handwritten character HC is touched again (Yes in step S37) and it is also determined that the touched point is moved within a fixed range of the characteristic points such as the apexes and the center of another drawn figure (Yes in step S38), the moved handwritten character HC is registered as a symbol or a mark of the characteristic points of the drawing, and data of the drawn figure that is being displayed on the figure input screen GF, including the handwritten character HC, is registered in the drawing data registration memory 12e (step S39).

After it is judged that the user's touch is released from the selected handwritten character HC (Yes in step S36), if it is determined that the handwritten character "l" HC is flicked in the left direction (FL) as shown in FIG. 13A (step S42), the handwritten character "l" HC that has been flicked in the left direction (FL) is recognized in accordance with the character recognition program 12b and converted into a regular italic character "l" RC, and the italic character is displayed (step S43).

If it is judged that the handwritten character HC is flicked in the right direction (FR), though not shown (step S40), the handwritten character HC that has been flicked in the right direction (FR) is recognized in accordance with the character recognition program 12b and converted into a regular gothic character GC, and the gothic character is displayed (step S41).

After that, as shown in FIG. 13B, a handwritten character "m" HC is drawn and displayed under the parallel lines PL in accordance with the same character input process (steps S27 to S43). Then, the handwritten character is converted into a regular italic character "m" RC and this italic character is displayed.

As shown in FIGS. 13B and 13C, in accordance with the processes of steps S1 to S3 and S10 to S14, a triangle TR corresponding to the touched points P1, P2 and P3 and their loci is drawn and displayed on the touch panel display unit 17 so as to conform to the displayed parallel lines PL.

After that, in accordance with the same character input process (steps S27 to S43), handwritten characters "A", "B" and "C" HC are drawn and displayed near the apexes of the triangle TR. Then, the handwritten characters are converted into regular gothic characters "A", "B" and "C" RC and these gothic characters are displayed.

As shown in FIGS. 14A and 14B, in accordance with the processes of steps S1 to S6, a circle Cir corresponding to the touched points P1 and P2 (P2') and the locus L is drawn and displayed on the touch panel display unit 17 such that it inscribes in the displayed triangle TR.

Then, as shown in FIG. 14C, the figure input screen GF on which the parallel lines (l, m) PL, triangle (A, B, C) TR and circle Cir are drawn and displayed in combination, and registered in the drawing data registration memory 12e.

(Drawing of Figure of Graph y)

Figure 15A:
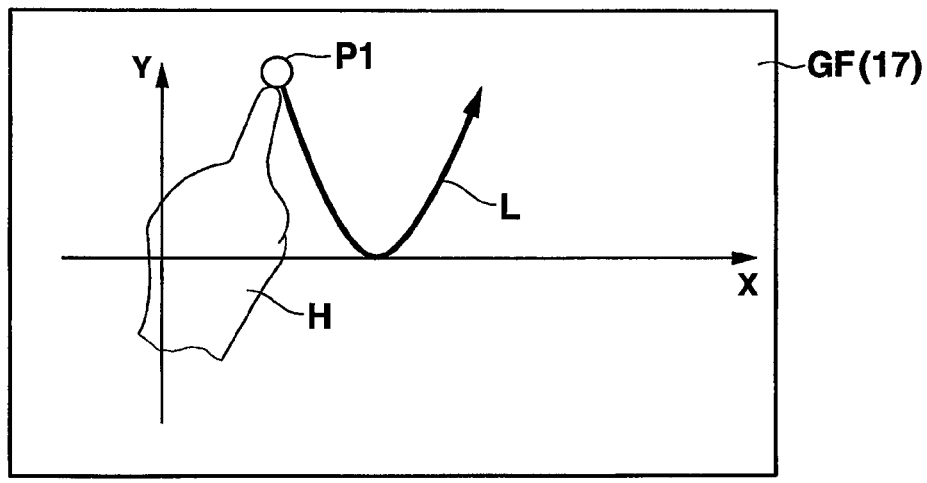
FIG. 15A shows a display operation performed on the figure input screen GF in accordance with a touch operation to draw and display graph y of an Nth-order curve through a figure drawing process of the touch panel PDA 10.
Figure 15:
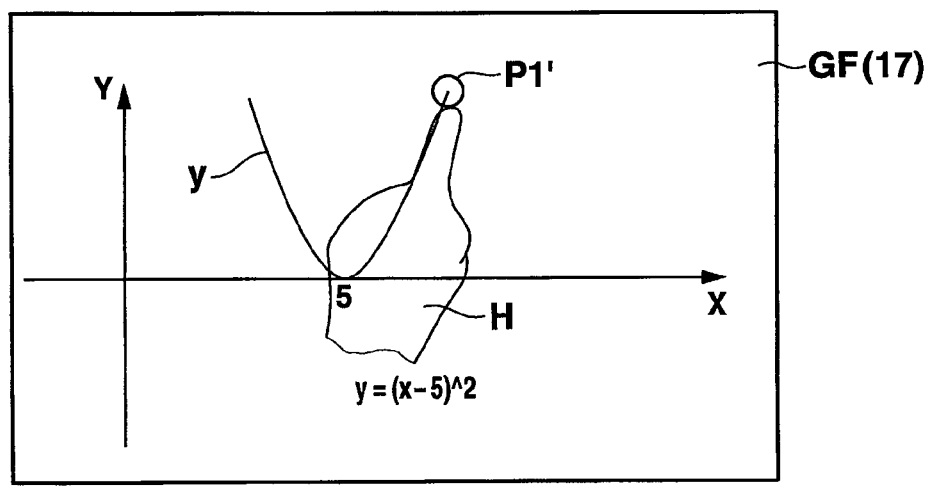
FIG. 15B shows another display operation performed on the figure input screen GF in accordance with a touch operation to draw and display graph y of an Nth-order curve through the figure drawing process of the touch panel PDA 10.

FIGS. 15A and 15B each show a display operation performed on the figure input screen GF in accordance with a touch operation to draw and display graph y of an Nth-order curve through a figure drawing process of the touch panel PDA 10.

When it is judged that a user touches the touch panel display unit 17 (Yes in step S1), if it is determined that X-Y coordinates are being displayed for graphical representation as shown in, for example, FIG. 15A (Yes in step S2), it is determined whether the user touches one point or two points (step S44/S52).

If the user touches one point P1 on the X-Y coordinates and moves the touched point P1 to draw a quadratic curve, it is judged that one point P1 is touched (Yes in step S44) and it is judged that the touched point P1 is moved (Yes in step S45) and it is judged whether the locus L satisfies a fixed condition of the Nth-order curve (step S46).

If it is judged that the locus L of the movement from the touched point P1 to the touched point P1' satisfies the condition of the quadratic curve (Yes in step S46), basic figure data of the quadratic curve is read out of the drawing figure database 12c, and a graph y of the quadratic curve whose size is adjusted is drawn and displayed so as to coincide with the locus L from the touched points P1 to P1' within a fixed range (step S47).

And a quadratic function expression $y=(x-5)^2$ corresponding to the graph y of the drawn quadratic curve is also displayed (step S48).

If it is judged that the locus L from the touched point P1 to the touched point P1' satisfies a fixed condition of a sinusoidal curve (Yes in step S49), basic figure data of the sinusoidal curve is read out of the drawing figure database 12c, and a graph y of the sinusoidal curve whose size is adjusted is drawn and displayed so as to coincide with the locus L from the touched points P1 to P1' within a fixed range (step S50).

And a sine function expression $y=\sin(x+\pi)$ corresponding to the graph y of the drawn sinusoidal curve is also displayed (step S51).

Figure 16A:
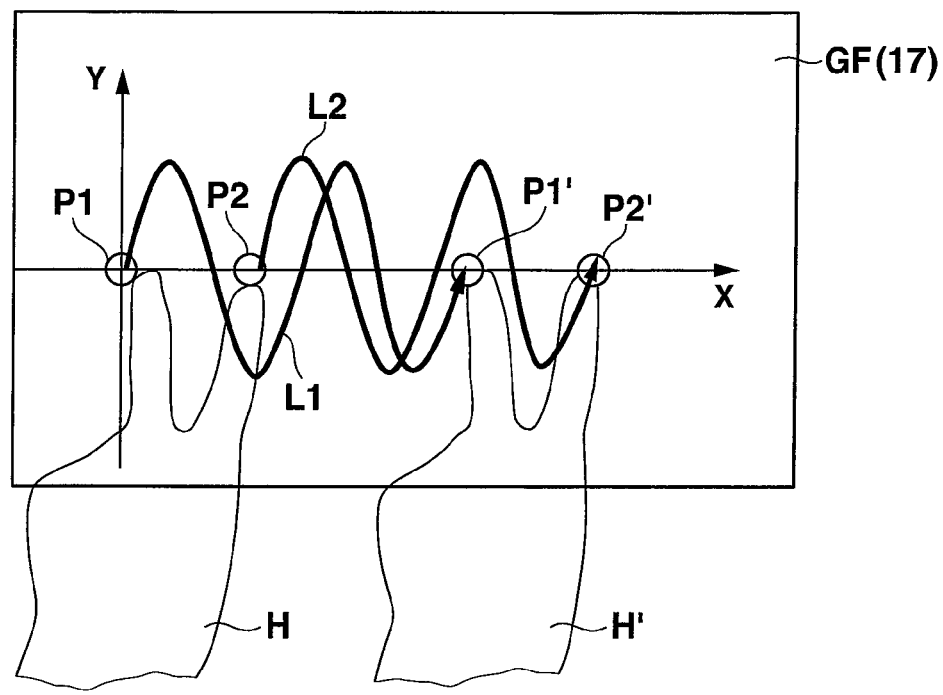
FIG. 16A shows a display operation performed on the figure input screen GF in accordance with a touch operation to draw and display graphs y1 and y2 of sinusoidal curves through a figure drawing process of the touch panel PDA 10.
Figure 16B:
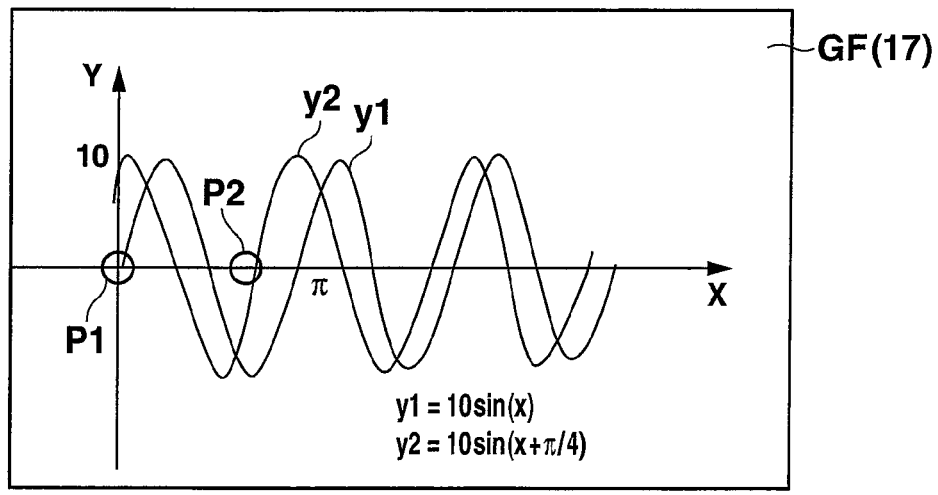
FIG. 16B shows another display operation performed on the figure input screen GF in accordance with a touch operation to draw and display graphs y1 and y2 of hyperbolic sine waves through the figure drawing process of the touch panel PDA 10.

FIGS. 16A and 16B each show a display operation performed on the figure input screen GF in accordance with a touch operation to draw and display graphs y1 and y2 of sinusoidal curves through a figure drawing process of the touch panel PDA 10.

If a user touches two points P1 and P2 on the X-Y coordinates and moves the touched points P1 and P2 to draw hyperbolic sine waves as shown in FIG. 16A, it is judged that two points P1 and P2 are touched (Yes in step S52) and it is judged that the touched points P1 and P2 are moved (Yes in step S53) and it is judged whether a locus L1 from the touched point P1 to the moved point P1' and a locus L2 from the touched point P2 to the moved point P2' each satisfy a fixed condition of the sinusoidal curve (step S57).

If it is judged that the locus L1 of the movement to the touched point P1' and the locus L2 of the movement to the touched point P2' satisfy the conditions of the sinusoidal curve (Yes in step S57), basic figure data of hyperbolic sine waves which differ in phase is read out of the drawing figure database 12c, and graphs y1 and y2 of the sinusoidal curves each size of which is adjusted, are drawn and displayed so as to coincide with the locus L1 from P1 to P1' and the locus L2 from P2 to P2' within a fixed range (step S58).

And, sine function expressions $y=10 \sin(x)$ and $y=10 \sin(x+\pi/4)$ corresponding to their respective graphs y1 and y2 of the drawn hyperbolic sine waves are also displayed (step S59).

If it is judged that the user does not move the two touched points P1 and P2 on the X-Y coordinates but releases the touched points (Yes in step S52. Yes in step S54), a graph y of a straight line connecting the touched points P1 and P2 is drawn and displayed (step S55).

And a linear function expression $y=f(x)$ corresponding to the drawn straight line is also displayed (step S56).

According to the figure drawing function of the touch panel PDA 10 with the above configuration, therefore, a user touches positions corresponding to a plurality of characteristic points of his or her desired figure on the touch panel display unit 17, moves the touched positions in accordance with the shape of the figure, and releases the touched positions and touches another position. Thus, the characteristic conditions of different figures (a circle, parallel lines, an equilateral triangle, a triangle, square, a rectangle, a quadrangle, a straight line, a concentric circle, an ellipse, etc.) are judged in accordance with the touched positions, the loci of movement of the touched positions, and the other touched position, thereby determining a type of the figure and a drawing-position thereof. In accordance with the determined figure type and drawing-position, a basic figure of a corresponding type is read out of the drawing figure database 12c, and drawn and displayed in the drawing-position with its size adjusted.

Therefore, it is natural that the above drawn figure is not a handwritten one, and the user need not choose a type of the figure in advance. Accordingly, the user can draw and display his or her desired figure quickly and clearly by his or her intuitive and graceful touch operation.

According to the figure drawing function of the touch panel PDA 10 with the above configuration, if a user touches one point and moves the touched point in accordance with the shape of a desired character, a handwritten character corresponding to the locus of the movement is drawn and displayed. If the user touches one point of the handwritten character and moves the touched point, the handwritten character is also moved in the direction of the movement and displayed. If the user touches and flicks the displayed handwritten character in the right direction, the handwritten character is recognized and converted into a gothic character and displayed. If the user flicks it in the left direction, the handwritten character is recognized and converted into an italic character and displayed.

Therefore, for example, a symbol and a mark, which are associated with the desired figure drawn and displayed on the touch panel display unit 17 in accordance with the user's touch operation, can easily be attached to an arbitrary position such as the center and apexes of the figure.

Furthermore, if a locus corresponding to a user's desired graph is touched and moved while X-Y coordinates are displayed on the touch panel display unit 17, the characteristic conditions of different graphs (an Nth-order curve, a sinusoidal curve, hyperbolic sine waves, etc.) are judged in accordance with the touched position and its locus, thereby determining a type of graph and a drawing-position thereof. In accordance with the determined graph type and drawing-position, a basic figure (graph) of a corresponding type is read out of the drawing figure database 12c, and drawn and displayed in the drawing-position with its size adjusted.

Therefore, it is natural that the above drawn figure (graph) is not a handwritten one, and the user need not choose a type of the figure (graph) in advance. Therefore, the user can draw and display his or her desired figure (graph) on graph coordinates quickly and clearly by his or her intuitive and graceful touch operation.

The processes and database of the touch panel PDA 10 according to the embodiment of the above figure drawing apparatus, such as the figure drawing processes (part 1 to part 3) shown in the flowcharts of FIGS. 2 to 4 and the drawing figure database 12c, can be stored in the external storage medium 13, such as a memory card (a ROM card, a RAM card, etc.), a magnetic disk (a floppy disk, a hard disk, etc.), an optical disk (a CD-ROM, a DVD, etc.) and a semiconductor memory, and distributed as programs that can be executed by a computer. The operation of a computer of the electronic apparatus including the touch panel display unit 17 is controlled by programs that are read out of the external storage medium 13 and stored in the storage unit 12, thereby achieving a figure drawing function corresponding to points touched by a user and a way to touch the points as described in the above embodiment and performing the same process using the above technique.

Program data for achieving the above techniques can be transferred on the network N as a form of a program code. If this program data is captured by the computer communication control unit 15 connected to the network N, the above figure drawing function corresponding to points touched by a user and a way to touch the points can be achieved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A figure drawing apparatus comprising:
   a touch panel;
   a display unit;
   a touch position detection unit which detects (i) a single touch position, (ii) a plurality of touch positions simultaneously, and (iii) a movement of at least one of the touch positions detected in accordance with a user's touch operation of the touch panel;
   a drawing figure determination unit which, when the touch position detection unit detects a plurality of touch positions simultaneously, determines a type of a figure and a drawing-position of the figure in accordance with the touch positions detected simultaneously and a following movement of the touch positions detected by the touch position detection unit, or the touch positions detected simultaneously and a new touch position other than the touch positions detected by the touch position detection unit;
   a figure display control unit which displays a figure on the display unit in accordance with the type of the figure and the drawing-position of the figure determined by the drawing figure determination unit;
   a one-point locus display control unit which, when the touch position detection unit detects the single touch position and then the movement of the single touch position, displays a locus of the movement of the single touch position on the display unit;
   a locus moving unit which selects and moves a locus of the movement of the touch position displayed on the display unit by the one-point locus display control unit; and
   a symbol registration unit which, when the locus of the movement of the touch position is moved into a predetermined range near a characteristic point of the drawing by the locus moving unit and is released from being selected within the predetermined range, registers the locus of the movement of the touch position as a symbol indicating the characteristic point of the drawing, and arranges the locus of the movement of the touch position in a position suitable as the symbol indicating the characteristic point of the drawing.

2. The figure drawing apparatus according to claim 1,
   wherein the touch position detection unit further detects at least one next touch position when the user's touches are released from some of the plurality of touch positions detected simultaneously in accordance with the user's touch operation of the touch panel; and wherein the drawing figure determination unit includes a next-touch drawing figure determination unit which, when the touch position detection unit detects the next touch position, determines a figure of a type and a drawing-position of the figure corresponding to the plurality of touch positions detected simultaneously and the next touch position.

3. The figure drawing apparatus according to claim 2, wherein the drawing figure determination unit includes:
  a triangle condition judging unit which judges that conditions of a triangle are satisfied when a next touch position is detected by the touch position detection unit when one of the plurality of touch positions detected simultaneously is released;
  a quadrangle condition judging unit which judges that conditions of a quadrangle are satisfied when next touch positions are detected by the touch position detection unit when some of the plurality of touch positions detected simultaneously are released; and
  a determination unit which determines that the type of the figure is a triangle when the triangle condition judging unit judges that the conditions of a triangle are satisfied, and determines the drawing-position of the triangle in accordance with the touch positions detected simultaneously and the next touch position, and which determines that the type of the figure is a quadrangle when the quadrangle condition judging unit judges that the conditions of a quadrangle are satisfied, and determines the drawing-position of the quadrangle in accordance with the touch positions detected simultaneously and the next touch positions.

4. The figure drawing apparatus according to claim 1, wherein the drawing figure determination unit includes an arc condition judging unit which judges that an arc condition is satisfied, when the touch position detection unit detects a plurality of touch positions simultaneously and further detects a movement of at least one of the plurality of touch positions,
  wherein when the arc condition judging unit judges that the arc condition is satisfied, the type of the figure is determined as a circle and the drawing position thereof is determined as a position corresponding to the locus of the movement if two touch positions are detected, and the type of the figure is determined as a concentric circle and the drawing position thereof is determined as a position corresponding to the locus of the movement if three or more touch positions are detected.

5. The figure drawing apparatus according to claim 1, wherein the drawing figure determination unit includes a parallel condition judging unit which judges that a parallel condition is satisfied, when the touch position detection unit detects a plurality of touch positions simultaneously and further detects movements of at least two of the plurality of touch positions,
  wherein when the parallel condition judging unit judges that the parallel condition is satisfied, the type of the figure is determined as parallel lines and the drawing position thereof is determined as a position corresponding to the locus of the movement.

6. The figure drawing apparatus according to claim 1, wherein the drawing figure determination unit includes:
  a coordinates display judging unit which judges whether graph coordinates are displayed on the display unit;
  an Nth-order curve condition judging unit which, when the coordinates display judging unit judges that the graph coordinates are displayed and the touch position detection unit detects a movement of a touch position, judges whether a locus of the movement of the touch position satisfies a condition for an Nth-order curve; and
  a sinusoidal curve condition judging unit which, when the coordinates display judging unit judges that the graph coordinates are displayed and the touch position detection unit detects a movement of a touch position, judges whether the locus of the movement of the touch position satisfies a condition for a sinusoidal curve,
  wherein the type of the figure is determined as an Nth-order curve and the drawing position thereof is determined as a position corresponding to the locus of the movement when the Nth-order curve condition judging unit judges that the locus of the movement of the touch position satisfies the condition for an Nth-order curve, and the type of the figure is determined as a sinusoidal curve and the drawing position thereof is determined as a position corresponding to the locus of the movement when the sinusoidal curve condition judging unit judges that the locus of the movement of the touch position satisfies the condition for a sinusoidal curve.

7. A figure drawing method of an electronic apparatus including a touch panel and a display unit, which allows a plurality of touch positions to be detected, the method comprising;
  performing a touch position detection function which detects (i) a single touch position, (ii) a plurality of touch positions simultaneously, and (iii) a movement of at least single touch positions in accordance with a user's touch operation of the touch panel;
  performing a drawing figure determination function for, when the touch position detection function detects a plurality of touch positions simultaneously, determining a type of a figure and a drawing-position of the figure in accordance with the touch positions detected simultaneously and a following movement of the touch positions detected by the touch position detection function, or the touch positions detected simultaneously and a new touch position other than the touch positions detected by the touch position detection function;
  performing a figure display control function for displaying a figure on the display unit in accordance with the type of the figure and the drawing-position of the figure determined by the drawing figure determination function;
  performing a one-point locus display control function for, when the single touch position is detected by the touch position detection function and then the movement of the single touch position is detected, displaying a locus of the movement of the single touch position on the display unit;
  performing a locus moving function which selects and moves a locus of the movement of the touch position displayed on the display unit by the one-point locus display control function; and
  performing a symbol registration function which, when the locus of the movement of the touch position is moved into a predetermined range near a characteristic point of the drawing the locus moving function and is released from being selected within the predetermined range, registers the locus of the movement of the touch position as a symbol indicating the characteristic point of the drawing, and arranges the locus of the movement of the touch position in a position suitable as the symbol indicating the characteristic point of the drawing.

8. A non-transitory recording medium having stored thereon a program which is executable by a computer of an electronic apparatus including a touch panel and a display unit, which allows a plurality of touch positions to be detected, the program being executable by the computer to control the computer to perform functions comprising:

- a touch position detection function which detects (i) a single touch position, (ii) a plurality of touch positions simultaneously, and (iii) next touch positions when a user's touches are released from some of the plurality of touch positions in accordance with a user's touch operation of the touch panel;
- a drawing figure determination function for, when the touch position detection function detects a plurality of touch positions simultaneously, determining a type of a figure and a drawing-position of the figure in accordance with the touch positions detected simultaneously and a following movement of the touch positions detected by the touch position detection function, or the touch positions detected simultaneously and a new touch position other than the touch positions detected by the touch position detection function;
- a figure display control function for displaying a figure on the display unit in accordance with the type of the figure and the drawing-position of the figure determined by the drawing figure determination function;
- a one-point locus display control function for, when the single touch position of one point is detected by the touch position detection function and then the movement of the single touch position is detected, displaying a locus of the movement of the single touch position on the display unit;
- a locus moving function which selects and moves a locus of the movement of the touch position displayed on the display unit by the one-point locus display control function; and
- a symbol registration function which, when the locus of the movement of the touch position is moved into a predetermined range near a characteristic point of the drawing by the locus moving function and is released from being selected within the predetermined range, registers the locus of the movement of the touch position as a symbol indicating the characteristic point of the drawing, and arranges the locus of the movement of the touch position in a position suitable as the symbol indicating the characteristic point of the drawing.

9. A figure drawing apparatus comprising:
- a touch panel;
- a display unit;
- a touch position detection unit which detects (i) a single touch position, (ii) a plurality of touch positions simultaneously, and (iii) a movement of at least one of the touch positions detected in accordance with a user's touch operation of the touch panel;
- a drawing figure determination unit which, when the touch position detection unit detects a plurality of touch positions simultaneously, determines a type of a figure, and a drawing-position of the figure in accordance with the touch positions detected simultaneously and a following movement of the touch positions detected by the touch position detection unit;
- a figure display control unit which displays a figure on the display unit in accordance with the type of the figure and the drawing-position of the figure determined by the drawing figure determination unit;
- a one-point locus display control unit which, when the touch position detection unit detects the single touch position and then the movement of the single touch position, displays a locus of the movement of the single touch position on the display unit; and
- a character display control unit which displays the locus of the movement of the touch position displayed by the one-point display control unit on the display unit as a handwritten character.

10. The figure drawing apparatus according to claim 9, further comprising:
- a character moving unit which selects and moves the handwritten character displayed on the display unit by the character display control unit; and
- a character registration unit which, when the handwritten character is moved into a predetermined range near a characteristic point of the drawing by the character moving unit and is released from being selected within the predetermined range, associates and registers the handwritten character with the characteristic point of the drawing, and arranges the handwritten character in a position suitable as the symbol indicating the characteristic point of the drawing.

11. The figure drawing apparatus according to claim 9, wherein the character display control unit recognizes a character of the handwritten character, converts the character of the handwritten character into a digital font, and displays the converted character.

12. The figure drawing apparatus according to claim 1, wherein, when a movement of the touch position is detected after a single touch position is detected by the touch position detection unit, the one-point locus display control unit displays the locus of the movement of the touch position as a character on the display unit.

13. The figure drawing apparatus according to claim 12, wherein the one-point locus display control unit includes:
- a character recognition unit which recognizes the locus of the movement of the single touch position displayed by the one-point locus display control unit as a character; and
- a character conversion display control unit which converts the locus of the movement of the single touch position displayed by the one-point locus display control unit into the character recognized by the character recognition unit and displays the character.

* * * * *